TELEVISION TYPE SELECTED RASTER LINES DISPLAY

Filed Feb. 6, 1961 2 Sheets-Sheet 1

INVENTOR.
WILLIAM H. GREATBATCH, JR.
WALTER L. WUSTER
BY
H. W. Loeb
ATTORNEYS

Jan. 28, 1964 W. H. GREATBATCH, JR., ET AL 3,119,949

TELEVISION TYPE SELECTED RASTER LINES DISPLAY

Filed Feb. 6, 1961 2 Sheets-Sheet 2

INVENTORS
WILLIAM H. GREATBATCH JR.
WALTER L. WUSTER
BY
H. H. Locke
ATTORNEYS

United States Patent Office 3,119,949

Patented Jan. 28, 1964

3,119,949

TELEVISION TYPE SELECTED RASTER LINES DISPLAY

William H. Greatbatch, Jr., and Walter L. Wuster, Indianapolis, Ind., assignors to the United States of America as represented by the Secretary of the Navy Filed Feb. 6, 1961, Ser. No. 87,507
9 Claims. (Cl. 315—26)
(Granted under Title 35, U.S. Code (1952), sec. 266)

Figure 1:
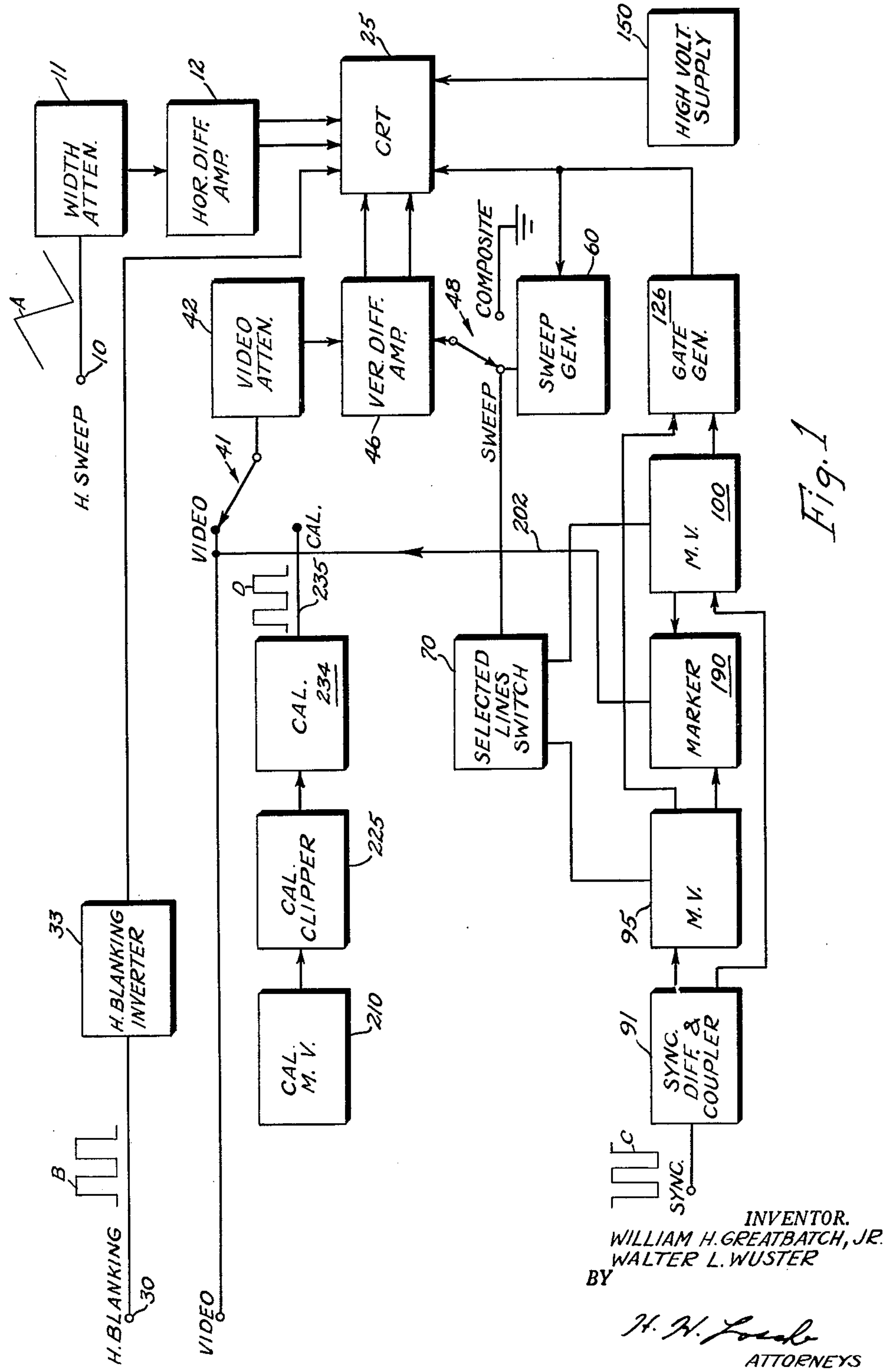

The invention described herein may be manufactured and used by or for the Government of the United States of America for governmental purposes without the payment of any royalties thereon or therefor.

This invention relates to cathode ray tube type displays of target objects resulting from reflected energy radiation, and more particularly to that type of raster display on the fluorescent screens of cathode ray tubes providing for the selection of a number of lines of the raster display to present the lines on the screen with the brightness modulation signal used to provide amplitude deflection along the vertical or Y-axis. To do this it is required that the lines be separated by changing the vertical sweep rate to permit the Y-axis deflection.

In known devices, where target objects are displayed on the fluorescent screens of cathode ray tubes, various means or methods are used to expand the target object signal pulses for study or comparison with reference pulses. No means are commercially known in which the raster line selection may be accomplished to provide amplitude deflection along with the vertical expansion of the cathode ray tube.

In the present invention a cathode ray tube of the electrostatic type has the horizontal electrostatic plates thereof driven by horizontal sweep voltages from an external source which are blanked by blanking voltages also from the external source. A differential amplifier is used to drive the vertical deflection plates of the cathode ray tube which differential amplifier has two inputs, one being the video signal to be viewed and the other being the vertical sweep voltages from a vertical sweep generating circuit. According to this invention the vertical sweep generator is coupled to a selector switch adaptable to place in circuit with the generator selective circuits of different time-constant elements to change the sweep rate of the vertical sweep generator. The vertical sweep generator is gated from a gating circuit driven by synchronizing pulses from the same external source as the horizontal sweep and blanking circuits. The synchronizing pulses trigger two monostable multivibrator circuits which produce the gating pulses. Each monostable multivibrator circuit is timed in its unstable condition-to-stable condition by time-constant elements coupled thereto through a selector switching means which switching means is a part of a composite switch including the time selector switch coupled to the vertical sweep generator. Each multivibrator is coupled to a marker circuit and the marker circuit is coupled to the video input to the vertical differential amplifier for producing bright fluorescent marks on the fluorescent screen for the limits of the selected number of lines chosen at the selector switch. In the examples given in the description of this invention, infra, the number of lines selected may be 50, 25, or 10 in a 125 line cathode ray tube visual scope. The system also includes the means of producing video reference signals which are switchable to the vertical differential amplifier for calibrating the video gain of the system. The system of this invention also contemplates a second mode of operation in which the vertical sweep generator is disconnectable from the vertical differential amplifier whereby the actual video signals or the reference video signals may be displayed along the horizontal trace of the fluorescent screen. It is therefore a general object of this invention to provide a device for gating out an amplitude display of a selected number of lines in the raster of a television cathode ray tube type of a fluorescent display of target objects received in a radiation reflecting system.

Figure 2:
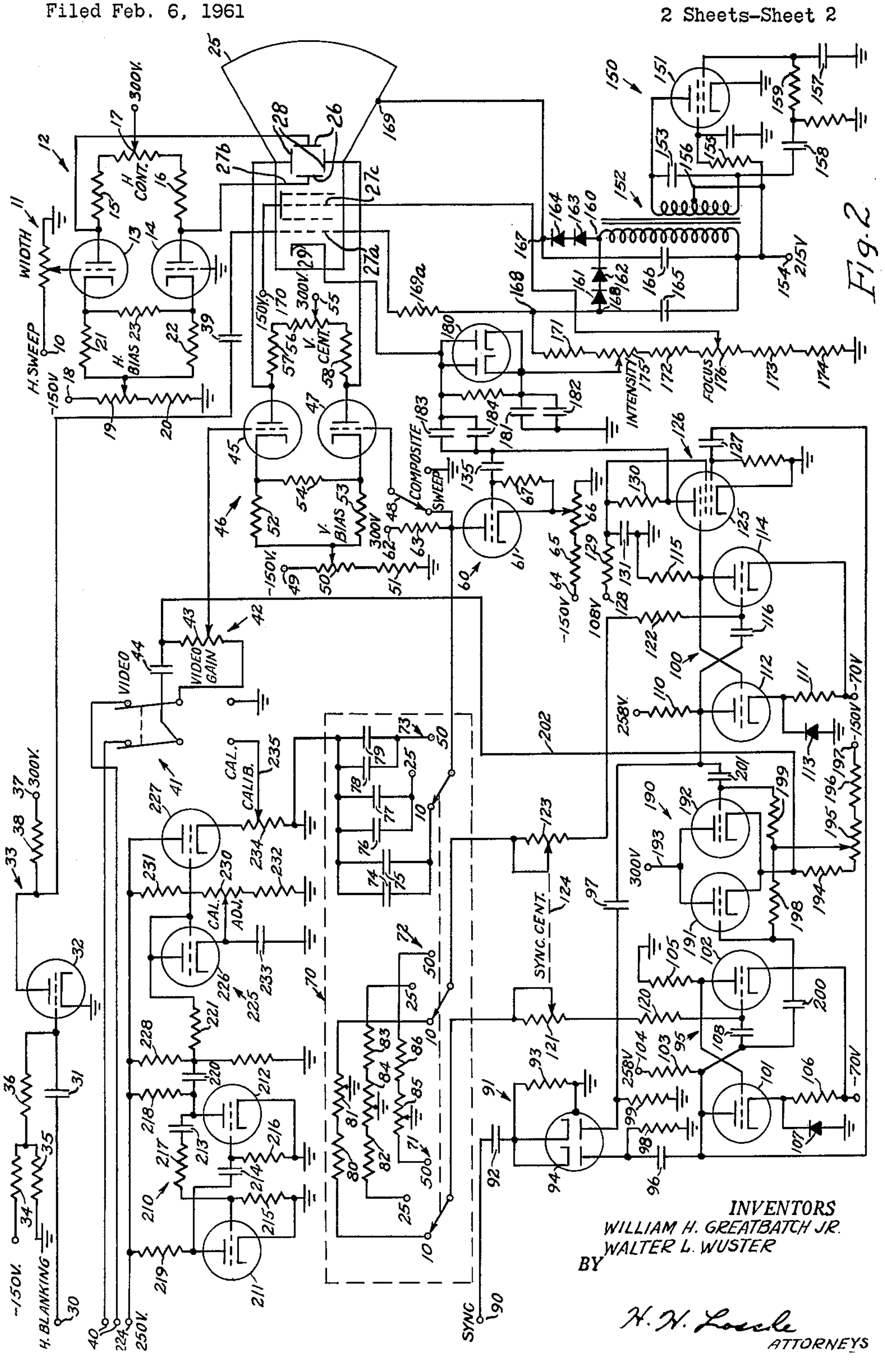

This and other objects and the attendant advantages and uses will become more apparent to those skilled in the art as the description proceeds when taken along with the accompanying drawings in which:

FIGURE 1 is a block diagram showing the lines of communication between blocks, and FIGURE 2 is a schematic circuit diagram of the system shown in FIGURE 1 with the various components thereof positioned in approximately the same location as the corresponding component blocks in FIGURE 1.

FIGURE 1 should be helpful in the overall understanding of the invention and is used to facilitate the description of the invention and to show the flow of information from the various components of the invention. In the description of this invention both FIGURES 1 and 2 will be referred to simultaneously, like components or blocks of FIGURE 1 bearing like reference characters in both the figures.

In describing this invention, it is to be understood that the transmitting and receiving devices (not shown) for transmitting and receiving electromagnetic or other radiations form no part of this invention but that certain information from such transmitting and receiving systems will be utilized in the present cathode ray tube display system as will be readily available in a practical manner as well understood by those skilled in the art. Such signals used from the transmitting and receiving system are the horizontal sweep signals, the horizontal blanking signals, the video signals, and the synchronizing signals. The horizontal sweep signals enter the structure of this invention at the terminal 10 and are applied across the resistance element of a potentiometer 11, the center tap of which is coupled to a horizontal differential amplifier 12. One of the horizontal sweep signals is represented by A in FIGURE 1. The horizontal differential amplifier 12 includes a double triode or a pair of triodes such as 13 and 14, the anodes of which are coupled through anode load resistors 15 and 16 across the resistance of a potentiometer 17 having the adjustable tap thereof coupled to an anode voltage source. The potentiometer 17 is adjustable for equalizing the anode voltages of the tubes 13 and 14 to produce horizontal centering of the horizontal sweep voltages on the cathode ray tube, soon to be described. Cathode bias of the tubes 13 and 14 is supplied at a terminal 18 across the resistance of a horizontal biasing potentiometer 19 and a fixed resistance 20 to a fixed potential such as ground. The adjustable tap of the potentiometer 19 is coupled in common to the cathode resistors 21 and 22 of the tubes 13 and 14, respectively. A resistor 23 across the cathodes of tubes 13 and 14 operates as a feedback resistor to improve the linearity of the horizontal sweep voltage. The adjustable tap of the potentiometer 11 is coupled to the control grid of the triode 13 and the grid of the triode 14 is coupled to a fixed voltage such as ground. The anodes of the triodes 13 and 14 are coupled, respectively, to opposite horizontal electrostatic plates 26 of a cathode ray tube 25. In this manner the beam of the cathode ray tube 25 will be driven horizontally across the face of the cathode ray tube screen in accordance with the horizontal sweep voltages A applied to the terminal 10.

The horizontal blanking signal coming from the prior discussed transmitting-receiving system (not shown) is applied to the terminal 30 which is capacitor coupled by the capacitor 31 to the grid of a triode 32 being the principal part of horizontal blanking inverter circuitry 33. The grid of the triode 32 is biased to cut off the tube by the divider network consisting of the resistors 34 and 35 coupled between a negative voltage source and a fixed potential, the junction of these resistors being coupled through a resistance 36 to the grid of the triode tube 32. Anode voltage is applied from a terminal 37 through an anode load resistor 38 to the anode of the triode 32. The anode of the horizontal blanking inverter tube 32 is coupled through a coupling capacitor 39 to the control grid 27*a* of the cathode ray tube 25 for blanking the return sweeps of the horizontal sweep voltages applied to terminal 10, as is well understood by those familiar with the cathode ray tube art. The horizontal blanking signals applied to the terminal 30 appear as positive square waves B as shown in FIGURE 1 which are inverted and applied as negative square wave voltages to the grid of the cathode ray tube 25.

The video signal coming from the transmitting and receiving system (not shown) is applied to the terminals 40 and conducted to the upper contacts of a video-calibration double-pole double-throw switch 41, one of the leads being the isolated fixed or ground potential of the transmitting and receiving system. When the switch blades of the double-throw switch 41 are thrown to the "video" or upper position as shown in FIGURE 1, the video signal is applied across a video gain attenuator 42 consisting of a potentiometer 43 and a direct current blocking capacitor 44. The adjustable tap of the video gain potentiometer 43 is coupled to the control grid of a first triode tube 45 in a vertical differential amplifier 46. The control grid of a second triode tube 47 of the vertical differential amplifier 46 is coupled to the switchable blade of a single-pole double-throw "sweep-composite" switch 48. The vertical differential amplifier 46 is very similar in construction with the horizontal differential amplifier 12 and has cathode grid bias applied from a negative voltage source at a terminal 49 applied across the resistance of a vertical biasing potentiometer 50 and a fixed resistance 51 to ground or a fixed potential. The adjustable tap of the vertical biasing potentiometer 50 is coupled in common to cathode load resistors 52 and 53, respectively, of the triodes 45 and 47. A feedback resistor 54 is coupled across the cathodes of the triodes 45 and 47 to improve the linearity of the vertical driving circuits. Anode voltage is applied to the anodes of the triodes 45 and 47 from a terminal 55 to the adjustable tap of a potentiometer 56, the opposite ends of which are coupled through anode load resistors 57 and 58 to the anodes of the triodes 45 and 47, respectively. The potentiometer 56 is adjustable to equalize the voltages on the anodes of the triodes 45 and 47 to produce vertical centering of the cathode ray tube beam on the screen of the cathode ray tube 25. The two vertical driving electrostatic plates 28 of the cathode ray tube 25 are coupled, respectively, to the anodes of the triodes 45 and 47 in the vertical differential amplifier 46.

The sweep voltages applied to the control grid of the triode tube 47 in the vertical differential amplifier 46 through the switch 48 are produced by a vertical sweep generator 60 consisting of a triode tube 61 having anode voltage applied thereto from a terminal 62 through an anode load resistor 63. Cathode voltage is applied from a negative voltage source coupled to the terminal 64 through the resistance 65 and the resistance of a potentiometer 66 to ground, the adjustable tap of the potentiometer being directly coupled to the cathode of tube 61. The control grid of tube 61 is biased by a grid resistor 67 coupled between the grid and cathode to make the tube normally conducting. The sweep contact of the "sweep-composite" switch 48 is coupled directly to the anode of tube 61 whereby sweep voltages, developed across the anode resistor 63 and companion time constant circuitry, soon to be described, are produced upon cutoff of the triode 61. The switch arm of switch 48, being coupled to the grid of tube 47 in the "sweep" switch position, functions to apply these vertical sweep voltages to the cathode ray tube 25.

A selected line switch 70 consists of three composite switch banks 71, 72, and 73, each having three terminals designated as 10, 25, and 50, indicating 10 lines, 25 lines, and 50 lines on the screen of the cathode ray tube 25, as will hereinafter be made clear. The movable contact of the switch bank 73 is coupled to the anode of the vertical sweep tube 61. Each contact 10, 25, and 50 is coupled, respectively, through parallel coupled capacitors 74, 75; 76, 77; and 78, 79 to ground. The paralleled capacitors are used in pairs to permit more accurate sweep amplitudes than can be obtained in standard parts although it is to be understood that precision parts may be found to accomplish the accuracy obtained in using pairs. The pairs of capacitors coupled to the switch bank 73 form a part of the time-constant circuit with the anode load resistance 63 to produce the selected sweep voltages in the vertical sweep generator 60. The switch banks 71 and 72 each have the 10-line contacts coupled through a fixed resistance 80 and the resistance of a potentiometer 81, the adjustable contact of the potentiometer 81 being coupled to a fixed or ground potential. The 25-line contacts of switch banks 71 and 72 are coupled through fixed resistors 82 and 83 and the resistance of a potentiometer 84 intermediate therebetween. The adjustable contact of the potentiometer 84 is coupled to ground or fixed potential. In like manner the 50-line contacts of the switch banks 71 and 72 are coupled through the resistance of a potentiometer 85 and a fixed resistor 86, the adjustable contact of the potentiometer 85 being connected to ground potential. The adjustable switch arms of each of the switch banks 71, 72, and 73, are mechanically coupled together so that the selected lines switch 70 may be selectively adjusted to either the 10, 25, or 50 contacts to produce, respectively, 10, 25, or 50 lines on the florescent screen of the cathode ray tube 25, as will be made clear in the remaining description.

The fourth and last signal utilized from the transmitting and receiving system (not shown) is a synchronizing signal applied to the terminal 90 and conducted to a synchronizing differentiator and coupler circuit 91. The differentiating network consists of a capacitor 92 and a resistance 93 in the coupling of the terminal 90 to the common coupling of the cathodes of a double diode tube 94. One anode of the coupling double diode 94 is coupled through a capacitor 96 to a first multivibrator circuit 95 and the other anode of the double diode 94 is coupled through a capacitor 97 to a second multivibrator 100. The anode voltages of the coupling diode 94 are developed across the anode resistors 98 and 99, respectively. Each multivibrator consists of a pair of triode tubes as is well understood in the art, the multivibrator 95 having triodes 101 and 102, the anode of the first being coupled through an anode load resistor 103 to a B+ source connected to terminal 104 and the anode of the triode 102 being coupled through its anode resistor 105 to a ground or fixed potential. The cathode of tube 101 is coupled through a cathode resistor 106 to a negative voltage source and also through a clamping diode 107 to a ground potential to maintain the cathode of this tube at ground potential or below. The cathode of the tube 102 is coupled directly to the negative voltage source. The synchronizing signal coming from the anode of the coupling double diode 94 through the capacitor 96 is coupled to the anode of tube 101 and through a capacitor 108 to the grid of tube 102. The control grid of tube 101 and the anode of tube 102 are cross coupled as is well understood in the multivibrator art. The multivibrator 100 is coupled in substantially the same manner as multivibrator 95 having an anode load resistor 110 and a cathode load resistor 111 for the first of the triode tubes 112 as well as a clamping diode 113 clamping the cathode of tube 112 to ground potential or below. The second of the triodes 114 has an anode resistor 115 with the anode of tube 112 capacitor coupled by 116 to the grid of tube 114 and the grid of tube 112 cross coupled to the anode of tube 114. The synchronizing pulse coming from the anode of the coupling double diode 94 through the capacitor 97 is coupled to the anode of tube 112 and, consequently, to the grid of tube 114 through the capacitor 116. The multivibrators 95 and 100 operate substantially the same and are biased to perform as the monopulse type and in the condition that tubes 102 and 114 are normally conducting until triggered by the synchronizing pulse. The time constant of the multivibrator 100 is longer than the time constant of multivibrator 95 causing multivibrator 95 to return to its stable state before that of multivibrator 100. The time constants of the two multivibrators are established by the switch banks 71 and 72 position of the selected lines switch 70. This is accomplished by the grid in the triode 102 being coupled by way of a resistance 120 and the resistance in a potentiometer 121 to the movable tap of the switch bank 71 in the selected line switch 70. In like manner, the control grid in the tube 114 of multivibrator 100 is coupled by way of a resistance 122 and the resistance in a potentiometer 123 to the movable tap of switch bank 72 in the selected line switch 70. The adjustable taps of each of the potentiometers 121 and 123 are electrically coupled to the switch blades of the switch banks 71 and 72, respectively, and are controlled in unison by a single actuator 124. The potentiometers 121 and 123 are adjustable to center the selected number of lines on the fluorescent screen of the cathode ray tube 25. The potentiometers 81, 84, and 85 are each adjustable in the 10, 25, and 50 lines selected to increase or decrease the time interval between the return of multivibrator 95 to its stable condition and the return of the multivibrator 100 to its stable condition, once the multivibrators are triggered to their unstable state by a synchronizing pulse.

The anode of the tube 114 in the multivibrator circuit 100 is coupled to the suppressor grid of pentode tube 125 in a gating generator circuit 126. The anode of the triode tube 101 in the multivibrator circuit 95 is coupled through a capacitor 127 to the control grid of the pentode gate generator 125. The screen grid of the pentode 125 is biased from a positive voltage source supplied to a terminal 128 and conducted through a resistance 129. The anode of the pentode 125 is likewise coupled to the resistance 129 through an anode load resistance 130, the junction of resistance 129 and 130 being coupled to one plate of a grounded smoothing or filtering capacitor 131. The anode of the pentode 125 is coupled through a coupling capacitor 135 to the grid of the vertical sweep tube 61 in the generator circuit 60. The synchronizing pulses applied to the terminal 90 are negative square wave pulses as illustrated by C in FIGURE 1. When a negative going synchronizing pulse C is applied to the multivibrator circuits 95 and 100, the negative pulses will be applied to the grids of the normally conducting tubes 102 and 114 to cut these tubes off which immediately produces an anode voltage rise for these two tubes that in like manner raises the grid voltage of tubes 101 and 112, respectively, to switch conduction to the latter two tubes. The selected lines switch, whether in the 10-line, 25-line, or 50-line position, will produce a shorter time interval for voltage build-up on the grid of the tube 102 in the multivibrator 95 than the voltage build-up on the grid of tube 114 in the multivibrator 100 by virtue of the relative resistance established in the selected lines switch circuit 70. The resistances in the selected lines switch circuit 70 are selected in correspondence with the capacitors of the switch bank 73 to produce proper timing of the multivibrators 95 and 100 and to produce the proper sweep voltage of the sweep generator circuit 60 to produce the 10, 25, and 50 line displays on the fluorescent screen of the cathode ray tube 25. When a synchronizing pulse from the anode of the coupling double diode 94 through the capacitor 96 is applied to the control grid of the gate generator tube 125, this gate generator will be disabled for conduction. At the same time the same synchronizing pulse is applied to switch the multivibrators 95 and 100 which switches condition from tube 102 to tube 101 causing a negative voltage at the anode of tube 101 to be applied through capacitor 127 to the control grid of gate generator tube 125. This negative voltage will then hold gate generator tube 125 in a nonconductive state. The multivibrator 100 is switched from tube 114 to tube 112 causing the anode voltage of tube 114 to rise which will raise the suppressor grid voltage of the gate generator tube 125; however, tube 125 cannot conduct by virtue of the negative voltage on the control grid. As soon as the voltage on the grid of tube 102 of the multivibrator 95 builds up to a point that this multivibrator returns to its monostable state in which tube 102 is again conducting, the anode voltage of tube 101 rises which likewise raises the control grid voltage of the gate generator tube 125 and this tube is then placed in a conducting state. The gate generator tube will remain in its conducting state until the voltage on the grid of tube 114 in the multivibrator circuit 100 rises to a point when this multivibrator returns to its monostable state at which time tube 114 again conducts and the anode voltage of tube 114 will make an abrupt drop, dropping a suppressor grid voltage of the gate generator tube 125, cutting off the conduction of this tube. The conduction period of the gating generator tube 125 produces a negative pulse which is the gating pulse produced for the time interval between the return of multivibrator 95 to its monostable condition and the multivibrator 100 to its monostable condiiton which is the gating pulse used to gate the vertical sweep generator 61 through the coupling capacitor 135. The tube 61 of the vertical sweep generator circuit 60 is normally conducting and will be cut off whenever the negative gating pulse is applied to the grid of this tube. The negative gating pulse drops the grid voltage of tube 61 sufficiently to cut off conduction thereof at which time a linear sweep voltage will be produced on the anode depending upon the time constant established by the anode voltage resistor 63 and the pair of capacitors in circuit therewith in the selected line switch 70 through the switch bank 73. As illustrated in FIGURE 2, the selected line switch 70 is set at 10 lines in which case the time constant established for the multivibrator 95 and multivibrator 100 and the vertical sweep generator 60 is for a 10-line display on the fluorescent screen of the cathode ray tube 25.

The high voltage supply for the cathode ray tube 25 is produced by an oscillator and a voltage doubler circuit 150. A high voltage supply represented by the reference character 150 is produced by a Hartley oscillator circuit including a tube 151 having its anode coupled to one end of a primary winding of high voltage transformer 152, the primary of which is coupled in parallel with a capacitor 153. Grid bias is established by a positive voltage supply to terminal 154 through a grid biasing resistor 155 with grid feedback from the primary of the transformer 152 through a conductor 156. The control grid of the oscillator tube 151 is coupled to ground through a capacitor 157 and the primary winding opposite the coupling of the anode is coupled through a capacitor 158 and a resistor 159 to the control grid of tube 151. The resistor 159 and the capacitor 157 constitute a low pass filter designed to suppress spurious oscillations in the oscillator tube 151 which could occur with shock excitation such as closure of a switch or sudden short in the circuit. The secondary of the high voltage transformer 152 is coupled at one lead to the terminal 154 and the other lead to a terminal 160 of a voltage doubler circuit consisting of two pairs of diodes 161, 162 and 163, 164, together with the capacitors 165 and 166. This establishes a high positive voltage at the terminal 167 and a high negative voltage at the terminal 168. The high voltage terminal 167 is coupled to the high voltage terminal 169 of the cathode ray tube 25 to supply high anode voltage thereto, and the high negative voltage terminal 168 is coupled through a high impedance resistance 169*a* to the control grid 27*a* of the cathode ray tube 25. The suppressor grid 27*b* of the cathode ray tube 25 is coupled to a positive voltage source at a terminal 170 and the high negative voltage terminal 168 is coupled through a voltage dividing circuit consisting of fixed resistors 171, 172, 173, and 174 to the fixed or ground potential. The voltage dividing circuit 171 to 174 also includes the resistance elements of an intensity potentiometer 175 and a focusing potentiometer 176, the movable tap of the latter being coupled to the focusing grid 27*c* of the cathode ray tube 25. Cathode voltage for the cathode 29 of cathode ray tube 25 is supplied from the anode of a double diode recharge tube 180, the cathodes of which are coupled in common to the adjustable contact of the intensity potentiometer 175. The cathodes of the double diode 180 are coupled in parallel through capacitors 181 and 182 to ground or fixed potential. The anodes of the double diode recharge tube 180 are coupled in common and are coupled through a matched pair of parallel coupled capacitors 183 and 184 to the anode of the gating generator tube 125. The coupling to the anode of the gate generator tube 125 causes the beam of the cathode ray tube 25 to be unblanked as it starts to sweep. At the same time the negative pulse at the anode of tube 180 cuts this recharge diode off so that the effective time constant is very large. This minimizes the tendency for the intensity to change during the sweep. After the gating pulse ends, the recharge diode again conducts and recharges the capacitors 183 and 184 in preparation for another cycle of operation. Capacitors 181 and 182 allow this recharging to take place at a more rapid rate than if the process had to take place through resistors.

It is desirable to have the upper and lower limits of the raster lines selected marked in some way on the fluorescent screen of the cathode ray tube 25. This is accomplished by a marker generator 190 consisting of a pair of triodes 191 and 192 having the anodes thereof directly coupled in common to an anode voltage source at the terminal 193. The cathodes of the tubes 191 and 192 are coupled in common through a resistance 194, a potentiometer resistance 195, and a fixed resistance 196 to a negative voltage source at terminal 197. The grids are biased from the adjustable tap of the potentiometer 195 through the grid resistances 198 and 199, respectively. The control grid of the triode 191 is coupled through a capacitor 200 to the anode of the triode 101 in the multivibrator 95 and the grid of the triode 192 is coupled through a capacitor 201 to the anode of the triode 112 in the multivibrator 100. Any negative sync pulses applied to the anode of tube 101 and grid of tube 102 in the multivibrator 95 is ineffective on the grid of the tube 191 in the marker generator circuit 190 since tube 191 is already cut off by grid bias. However, when the multivibrator 95 returns to its stable state, a positive pulse is produced across the anode resistor 103 of the triode 101 in the multivibrator 95 which is differentiated by the capacitor 200, resistance 198 combination to differentiate this positive pulse on the grid of the tube 191 in the marker generator 190. This produces flash conduction of tube 190 to produce a positive pulse across the resistors 194, 195, and 196 which is applied through a conductor 202 to the video gain input across the resistance of a video gain potentiometer 43. This pulse on the video gain of the cathode ray tube 25 will produce an amplitude mark, such as a small vertical spike, on the fluorescent scope of the cathode ray tube to mark one limit of the raster of 10 lines as set by the selected line switch 70 since this is the beginning of the gated vertical sweep. In like manner, the negative sync pulse applied to the anode of tube 112 and multivibrator 100 is ineffective on the grid of tube 192 in the marker generator circuit since this tube is biased to cut off through the grid resistance 199 and potentiometer 195. Upon the multivibrator 100 being returned to its stable condition, conduction of the tube 112 in the multivibrator 100 will be cut off producing a positive pulse across the anode resistor 110 which is effective through the coupling capacitor 201 and resistor 199 to differentiate the pulse for application to the grid of tube 192 in the marker generator 190 to produce flash conduction of this tube and thereby produce a positive pulse on the cathode which is again effective through the conductor 202 across the video gain potentiometer 43 to produce a second amplitude marker on the fluorescent screen on the cathode ray tube 25 ending the vertical gated sweep. As hereinbefore stated, the time constant of the multivibrator 100 is longer than the time constant of the multivibrator 95, these time constants being predetermined in the selected line switch 70 to produce markers on the first line and the last line of the 10-line raster. If the 10-line raster is not centrally located on the fluorescent screen of the cathode ray tube 25, the sync centering switch 124 may be adjusted to center this raster. Potentiometer 195 is adjustable to control the grid bias of the marker generator circuit 190 to produce the markers at the proper instant. The markers generated in this marker generator circuit 190 can also be utilized to provide brightened markers on cathode ray tube indicators in the preceding transmitter-receiver system (not shown) providing the video signals by feedback through the terminals 40.

In order to properly calibrate the video gain of the cathode ray tube 25 a means is provided to produce simulated video signals. This is accomplished by using a free running multivibrator 210 consisting of a pair of triode tubes 211 and 212 having the grids thereof cross coupled through capacitors 213 and 214. Grid bias is applied by the resistances 215 and 216, a resistance 217 being additionally coupled in the cross anode-to-grid coupling in series with the capacitor 213. Anode voltage is applied to the anodes of tubes 211 and 212 through the anode resistors 218 and 219, respectively. To allow for variations due to loading, the anode resistances 218 and 219 are unequal and likewise the combination of the resistance 216 is unequal to the resistance combination 215 and 217 which make the grid time constants unequal. However, the free running multivibrator is constructed and arranged to produce square waves with the timing of both halves closely equal to each other. A capacitor 220 couples the output of the free running multivibrator 210 through a resistor 221 to a clipper diode and cathode follower circuit 225.

The clipper and cathode follower circuit 225 comprises a pair of triode tubes 226 and 227, of which 226 is supplied anode voltage through the resistance 221 and a resistance 228 from a positive voltage source applied at terminal 224. The anode voltage of cathode follower tube 227 is supplied directly from the terminal 224. The clipper triode 226 has cathode voltage supplied from the adjustable tap of a calibration adjusting potentiometer 230 which is in a voltage divider circuit from the terminal 224 and fixed resistances 231 and 232 to ground or fixed potential. The cathode of the clipper triode 226 has a capacitor 233 between it and ground and the anode and grid of this tube are coupled in common, this common coupling being coupled to the grid of the cathode follower tube 227. The cathode output of the cathode follower tube 227 is taken from the adjustable tap of a calibration adjusting potentiometer 234, the resistance element of which is the cathode resistance of the cathode follower tube 227. The adjustable tap of the calibrating potentiometer 234 is coupled through the conductor 235 to the lower switch contacts of the video-calibration switch 41, the other contact thereof being coupled directly to ground. The free running multivibrator 210 produces oscillations as hereinbefore stated, the positive peaks of which are clipped by the clipper tube 226 to produce substantially square waves on the output lead 235 of the cathode follower 227 in the form of waves shown by D in FIGURE 1. Whenever it is desirable to recalibrate the setting of the video gain attenuator 42, the video-calibration switch 41 may be thrown to the lower or calibrate position and the video attenuator 42 adjusted for a desirable amplitude display on the cathode ray tube 25. After calibration of the video attenuator 42, the video-calibration switch 41 should again be returned to its upper "video" switch position for conduction of the actual video signals coming from the terminals 40 to the cathode ray tube 25 for the display of the video signals thereon.

*Operation*

In the operation of the above-described device let it be assumed, for the purpose of example, that the video attenuator has been calibrated and that the video calibration switch 41 rests in the upward "video" position, as shown in FIGURE 1. For the purpose of example, let it also be assumed that the sweep-composite switch 48 is thrown to the "sweep" position shown in FIGURE 1 and that the selected line switch 70 is on the 10-line position shown in FIGURE 2. The horizontal sweep, utilizing the incoming sweep voltages at terminal 10 represented by the waveform A in FIGURE 1, produces a horizontal trace on the cathode ray tube 25 and the vertical sweep generator 60 is operative to produce linear sawtooth voltage sweeps on the grid of tube 47 in the differential amplifier 46 to produce a greatly expanded raster of horizontal lines in the fluorescent screen of cathode ray tube 25, this raster being substantially the 10 lines chosen by the selected line switch 70. The first and tenth line of the 10-line raster so produced should be amplitude marked by virtue of the operation of the marker generator 190 in a manner hereinabove described. The horizontal retraces should be blanked out by virtue of the horizontal blanking circuit established from the terminal 30 through the horizontal inverting blanking circuit 33 and applicable to the control grid of the cathode ray tube 25. The vertical retrace is blanked by virtue of the multivibrator circuits 95 and 100 and the gate generator 126 producing gated voltages on the grid of the sweep generator 60 in accordance with synchronizing pulses applied at terminal 90, which synchronizing pulses are in synchronism with the horizontal sweep voltages applied at terminal 10 and the horizontal blanking voltages applied at terminal 30, all coming from the transmitter-receiver system (not shown) but hereinabove described as preceding the circuitry of this invention and supplying the four signals used in the present invention. High voltage for the cathode ray tube 25 is supplied by the high voltage circuit 150, this high voltage circuitry also supplying the voltages for the intensity control potentiometer 175 and the focusing potentiometer 176 whereby the brightness or intensity of the cathode ray tube and the focus of the electron beam of the cathode ray tube is adjustable, as desired. The gating generator output being coupled to the cathode of the cathode ray tube 25 through the capacitor combination 183, 184 and to the recharging diode 180 acts to minimize any brightness change on the cathode ray tube 25 during the application of the vertical sweep voltage through the vertical differential amplifier 46. Horizontal and vertical centering adjustment for cathode ray tube 25 may be accomplished by the horizontal centering control 17 and the vertical centering control 56. Centering of the selected line raster on the cathode ray tube 25 may further be adjusted by the sync centering control 124. Where it is desired to have a less expanded raster in the vertical direction, the selected line switch 70 may be moved to the 25-line position or the 50-line position, if desired. Merely by switching the selected line switch 70 the elements in the switch circuit are such to establish time constants which will produce proper gating pulses and proper vertical sweep voltages to produce the selected lines on the transparent screen of the cathode ray tube, each member of lines selected being marked at its limits by operation of the marker generator circuit 190 as hereinbefore described. Any video signals appearing on the terminals 40 will likewise be displayed on this selected raster, it being understood that the video signals will be enlarged in amplitude in accordance with the adjustment of the selected lines switch 70; that is, the lesser number of lines selected the greater will be the video signal enlargement. Such enlargements of the video signal will enable more accurate study of the video signals in size and number.

The above description of operation represents one mode of operation of the invention. Another capability of the invention is a mode in which the video signals may be studied along a single horizontal trace which may be accomplished by throwing the sweep-composite switch 48 to the "composite" position grounding the grid of the triode 47 in the differential amplifier 46. All vertical sweep voltages being cut off, the video signals may then be studied in amplitude along a horizontal trace produced by the horizontal sweep circuits of the cathode ray tube 25. In this mode of operation the video calibration switch 41 may be thrown to the calibrate position for calibrating the video gain potentiometer 43 of the video gain attenuator 42.

The two above modes of operation of the cathode ray tube display of target objects may readily be used in the amplitude study of video target objects in more accurately establishing the size and number of the target objects represented by the video signals. Such target object study is essential to National Defense and particularly to fighter or reconnaissance aircraft but may be equally applicable in commercial use of aircraft or other service to determine the size, position, and number of moving objects about the point of investigation established by this equipment.

While many modifications and changes may be made in the constructional details and features of this invention by rearrangement or substitution of parts to obtain equivalent results an functions, it is to be understood that we desire to establish our invention only by the spirit and scope of the appended claims. While values of voltages have been set out in FIGURE 2 to facilitate the understanding of this schematic circuit and the operation thereof, it is to be understood that other voltage values may well be used to accommodate similar or equivalent parts in the circuit to accomplish the same results and functions as hereinabove set forth without limiting the invention. Applicants wish to be limited in their invention only by the scope of the appended claims.

We claim:

1. A device for gating out an amplitude display of selected lines from a television type of raster comprising: a cathode ray tube having horizontal and vertical deflection elements therein and a fluorescent screen; means coupled to the horizontal deflection elements of said cathode ray tube to produce horizontal deflection of the cathode ray tube beam; a vertical sweep generator having coupling means to the vertical deflection elements of said cathode ray tube to produce, together with said horizontal deflection means, a raster of horizontal lines on the cathode ray tube fluorescent screen; a selected lines switch having a plurality of selected switch positions, each switch position having circuit elements therein to establish a different circuit constant from the other switched positions; and a synchronous gating means including a pair of multivibrators and a gate generator, each multivibrator being coupled to said selected lines switch to produce a difference in time that each multivibrator remains in one state, said multivibrators being coupled to said gate generator to generate gating pulses coextensive with the time interval of said one state of said multivibrators, and said gate generator has its output coupled to said cathode ray tube and to said vertical sweep generator whereby said plurality of switched positions provides a plurality of vertical raster expansion displays on said cathode ray tube fluorescent screen.

2. A device as set forth in claim 1 wherein said selected lines switch is a composite of three switches, each having said plurality of positions, each position in two of said composite of three switches being coupled to electrical elements establishing unequal time constants.

3. A device as set forth in claim 2 wherein said electrical elements establishing the time constants of the plurality of positions for two of the three switches coupled to said two multivibrators are resistors in series, one resistor of which is variable; and wherein the electrical elements establishing the time constants of the plurality of positions for the third switch are capacitors, the plurality of positions corresponding with and compatible to the provision of said plurality of vertical raster expanded displays on said cathode ray tube screen.

4. A device for gating out an amplitude display of selected lines from a television type of raster comprising: a cathode ray tube having horizontal and vertical deflection elements therein and a fluorescent screen; means coupled to the horizontal deflection elements of said cathode ray tube to produce horizontal deffection of the cathode ray tube beam; a differential amplifier having the outputs thereof coupled to the vertical deflection elements of said cathode ray tube; a video signal source and a vertical sweep generator coupled to said differential amplifier to produce, together with said means to produce horizontal deflections, a raster of horizontal lines on the cathode ray tube fluorescent screen and superimposed video signal display; a source of synchronous pulses; a synchronous gating means having a pair of monostable multivibrators triggered by said source of synchronous pulses and having a gating generator coupled to the outputs of said monostable multivibrators, said gating generator being coupled to said cathode ray tube and to said vertical sweep generator to gate the intensity of said cathode ray tube beam and the sweep voltages of said sweep generator in unison by gating pulses, the gating pulses each being established by the return of said monostable multivibrators to the stable condition; and a composite selected lines switch of three switches coupled to said multivibrators and to said vertical sweep generator to switchably connect selected circuit time constant elements thereto to establish time intervals of gating and vertical sweeping voltages producing selected expansions of said raster in the vertical direction thereby selecting horizontal lines of said raster, said time constant elements of the switches coupled to said multivibrators being resistors in series with a potentiometer having the adjustable tap connected to a fixed potential to control the monostable multivibrators time interval return to stable condition, and said time constant elements of the switch coupled to said vertical sweep generator being capacitors to control the time period of the vertical sweep generator being capacitors to control the time period of the vertical sweep voltage generated to correspond in time interval with said gating.

5. A device as set forth in claim 4 wherein said vertical sweep generator is switchable in and out of the coupling to said differential amplifier whereby video signals are viewable in amplitude along the horizontal trace on said fluorescent screen.

6. A device as set forth in claim 4 wherein said coupling of said video signal source and said differential amplifier includes a calibration switch capable of selectively switching said differential amplifier to said video signal source and a reference standard signal source.

7. A device for gating out an amplitude display of selected lines from a television type of raster comprising: a cathode ray tube having a cathode, horizontal and vertical deflection elements therein, and a fluorescent screen; means coupled to the horizontal deflection elements of said cathode ray tube to produce horizontal deflection of the cathode ray tube beam; a blanking signal source in synchronism with said means coupled to said horizontal deflection elements coupled to said cathode ray tube to blank the cathode ray tube beam during retrace of horizontal deflection; a video signal source, a calibration switch, an attenuator, a vertical sweep generator, and a vertical sweep generator switch; a differential amplifier having two outputs coupled to the vertical deflection elements of said cathode ray tube and having two inputs, one input being from said video signal source through said calibration switch and said attenuator, and the other input being from said vertical sweep generator through said sweep generator switch selectable to be switched to a fixed potential, said vertical sweep generator being capable, together with the means coupled to said horizontal deflection elements, to produce a raster on the fluorescent screen of said cathode ray tube with superimposed video signal display; a source of synchronous pulses; a synchronous gating means having a pair of monostable multivibrators triggered by source of synchronous pulses and having a gating generator coupled to the output of each multivibrator, the gating output of each said gating generator being coupled to said cathode ray tube cathode and to said vertical sweep generator to gate the intensity of said cathode ray tube beam and the sweep voltages of said sweep generator in unison; and a selector lines switch having two switch banks coupled respectively to said two monostable multivibrators with each corresponding selected position of each switch bank having a resistive element thereacross and a movable tap of said resistive element coupled to a fixed potential whereby each selected position is adjustable to inversely vary the time constant of the respective monostable multivibrator in its return to stable from an unstable condition, and said selector lines switch having a third switch bank coupled to said vertical sweep generator with capacitors switchable thereby in correspondence with the selection of the selector lines switch to control the time constant of the generated sweep voltage whereby gating, blanking, and sweeping voltages are operative in the selected positions of the selector lines switch to selectively expand the raster in the vertical direction on said fluorescent screen thereby selectively enlarging video signals in amplitude.

8. A device as set forth in claim 7 wherein said monostable multivibrators activate marker means coupled to said one input of said differential amplifier to produce high intensity marks at the top and bottom of the raster of said cathode ray tube for each selected position of the selector line switch.

9. A device as set forth in claim 7 wherein said coupling of said video input signal to said one input to said differentail amplifier through said calibration switch is switchable to apply reference video signals to said cathode ray tube, and wherein said coupling of said vertical sweep generator through said sweep generator switch is adaptable to switch said other input of said differential amplifier to a fixed potential to present video signals in amplitude display on a single horizontal raster line.

References Cited in the file of this patent

UNITED STATES PATENTS

| | | |
|---|---|---|
| 2,463,969 | Hulst | Mar. 8, 1949 |
| 2,479,880 | Toulon | Aug. 23, 1949 |
| 2,685,661 | Barton | Aug. 3, 1954 |

FOREIGN PATENTS

| | | |
|---|---|---|
| 671,285 | Great Britain | Apr. 30, 1952 |

UNITED STATES PATENT OFFICE
CERTIFICATE OF CORRECTION

Patent No. 3,119,949 January 28, 1964

William H. Greatbatch, Jr., et al.

It is hereby certified that error appears in the above numbered patent requiring correction and that the said Letters Patent should read as corrected below.

Column 6, line 7, for "condition" read -- conduction --; column 10, line 41, for "an" read -- and --; column 11, lines 55 and 56, strike out "generator being capacitors to control the time period of the vertical sweep"; column 12, line 23, after "by" insert -- said --; line 25, strike out "each".

Signed and sealed this 23rd day of June 1964.

(SEAL)
Attest:

ERNEST W. SWIDER
Attesting Officer

EDWARD J. BRENNER
Commissioner of Patents